United States Patent
Jaeger

(10) Patent No.: US 10,075,126 B2
(45) Date of Patent: Sep. 11, 2018

(54) APPARATUS FOR CLEANING SURFACES

(71) Applicant: Anton Jaeger, Senden (DE)

(72) Inventor: Anton Jaeger, Senden (DE)

( * ) Notice: Subject to any disclaimer, the term of this patent is extended or adjusted under 35 U.S.C. 154(b) by 475 days.

(21) Appl. No.: 14/725,201

(22) Filed: May 29, 2015

(65) Prior Publication Data

US 2015/0349707 A1    Dec. 3, 2015

(30) Foreign Application Priority Data

Jun. 2, 2014 (DE) .................. 10 2014 107 733

(51) Int. Cl.
| | |
|---|---|
| *H02S 40/10* | (2014.01) |
| *B08B 3/04* | (2006.01) |
| *F24S 40/20* | (2018.01) |
| *A46B 11/06* | (2006.01) |
| *A46B 13/06* | (2006.01) |
| *B08B 1/00* | (2006.01) |
| *B08B 1/04* | (2006.01) |
| *A46B 13/00* | (2006.01) |

(52) U.S. Cl.
CPC ............ *H02S 40/10* (2014.12); *A46B 11/063* (2013.01); *A46B 13/003* (2013.01); *A46B 13/06* (2013.01); *B08B 1/002* (2013.01); *B08B 1/008* (2013.01); *B08B 1/04* (2013.01); *B08B 3/04* (2013.01); *F24S 40/20* (2018.05); *A46B 2200/30* (2013.01); *Y02E 10/40* (2013.01)

(58) Field of Classification Search
CPC ..... A46B 11/063; A46B 13/003; A46B 13/06; B08B 1/002; B08B 1/008; B08B 1/04; B08B 3/04
See application file for complete search history.

(56) References Cited

U.S. PATENT DOCUMENTS

| | | | |
|---|---|---|---|
| 9,377,219 B2 * | 6/2016 | Jaeger | ............ B08B 1/04 |
| 2006/0242774 A1 | 11/2006 | Schmid | |
| 2010/0014910 A1 * | 1/2010 | Jaeger | ............ A47L 1/08 |
| | | | 401/268 |
| 2012/0311799 A1 | 12/2012 | Jaeger | |
| 2015/0096134 A1 | 4/2015 | Jaeger | |

FOREIGN PATENT DOCUMENTS

| | | |
|---|---|---|
| DE | 3113645 A1 | 10/1982 |
| DE | 3329631 A1 | 3/1985 |
| DE | 19909992 C1 | 10/2000 |
| DE | 103 51 880 B3 | 5/2005 |
| DE | 102010018011 A1 | 10/2011 |
| DE | 102011103537 A1 | 12/2012 |
| DE | 102012212126 A1 | 1/2014 |
| EP | 2147625 A1 | 1/2010 |

* cited by examiner

*Primary Examiner* — Shay Karls
(74) *Attorney, Agent, or Firm* — Dinsmore & Shohl LLP

(57) ABSTRACT

The invention relates to an apparatus for cleaning surfaces, in particular of solar collectors and/or of photovoltaic installations, having at least one cleaning member, in particular a brush roller or plate brush, moving, in particular rotating, during the cleaning operation, having a holding device for the cleaning member, having a fluid drive for the cleaning member operable in different states and having a switching device with which a change can be made between the different operating states of the fluid drive.

33 Claims, 12 Drawing Sheets

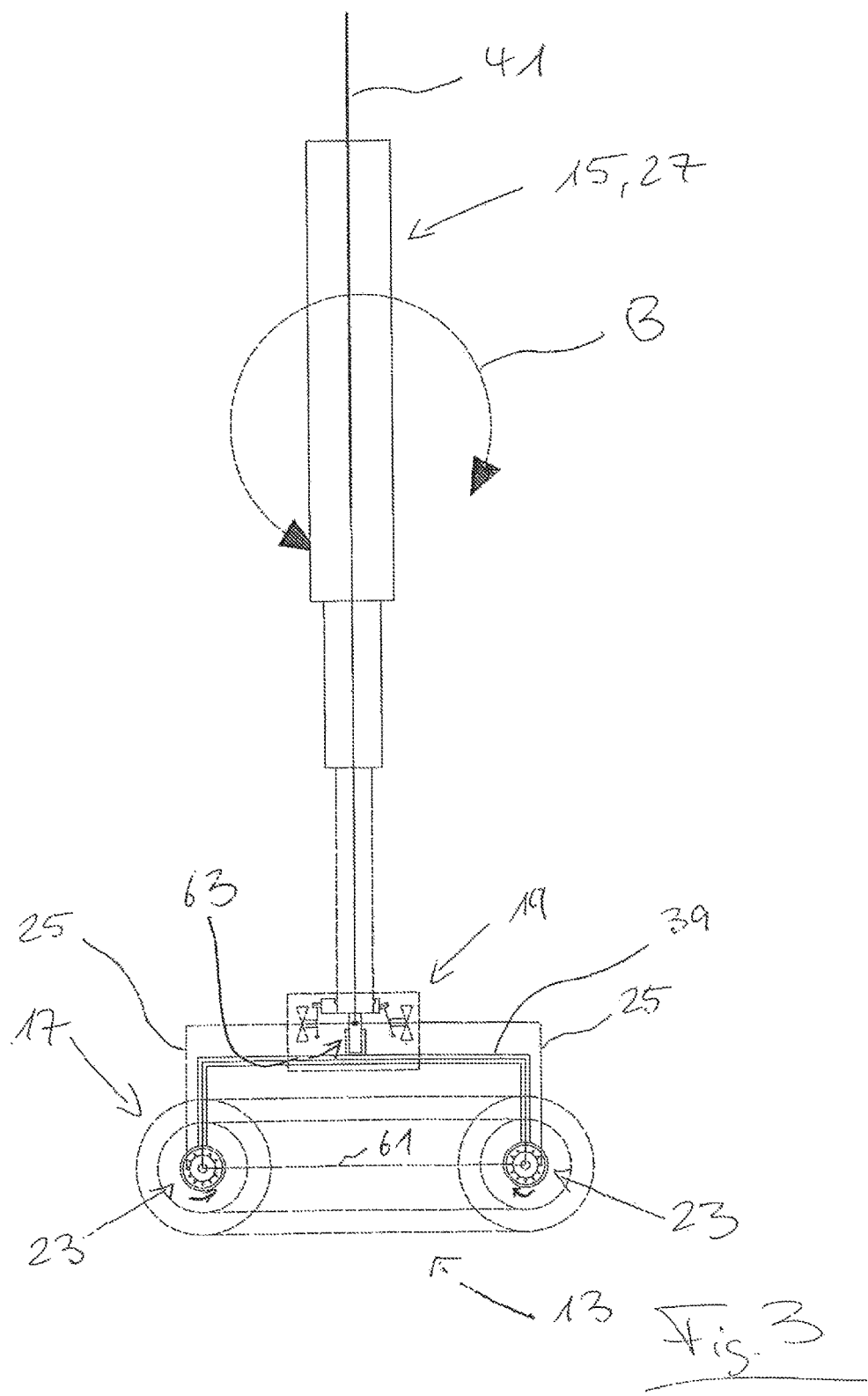

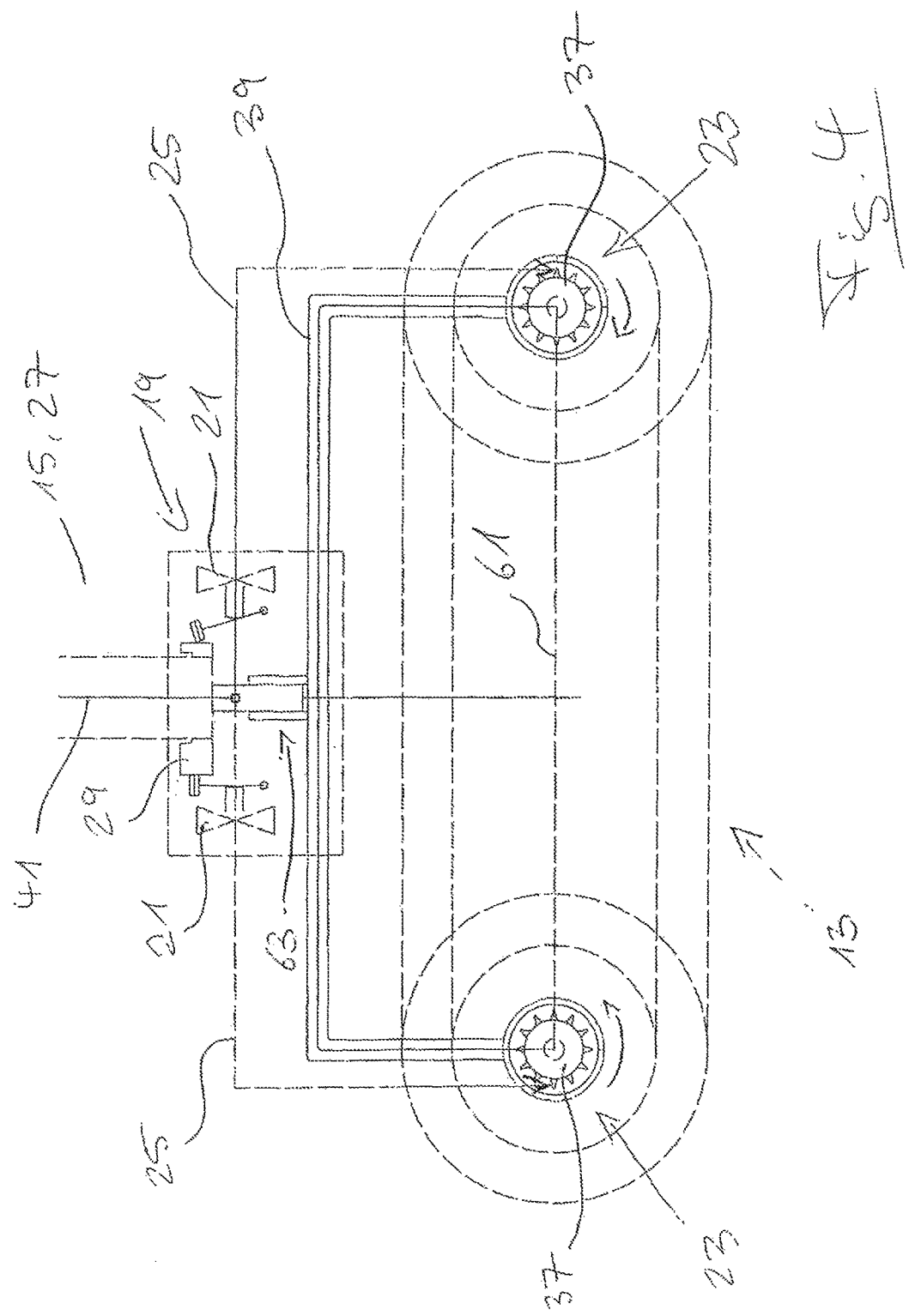

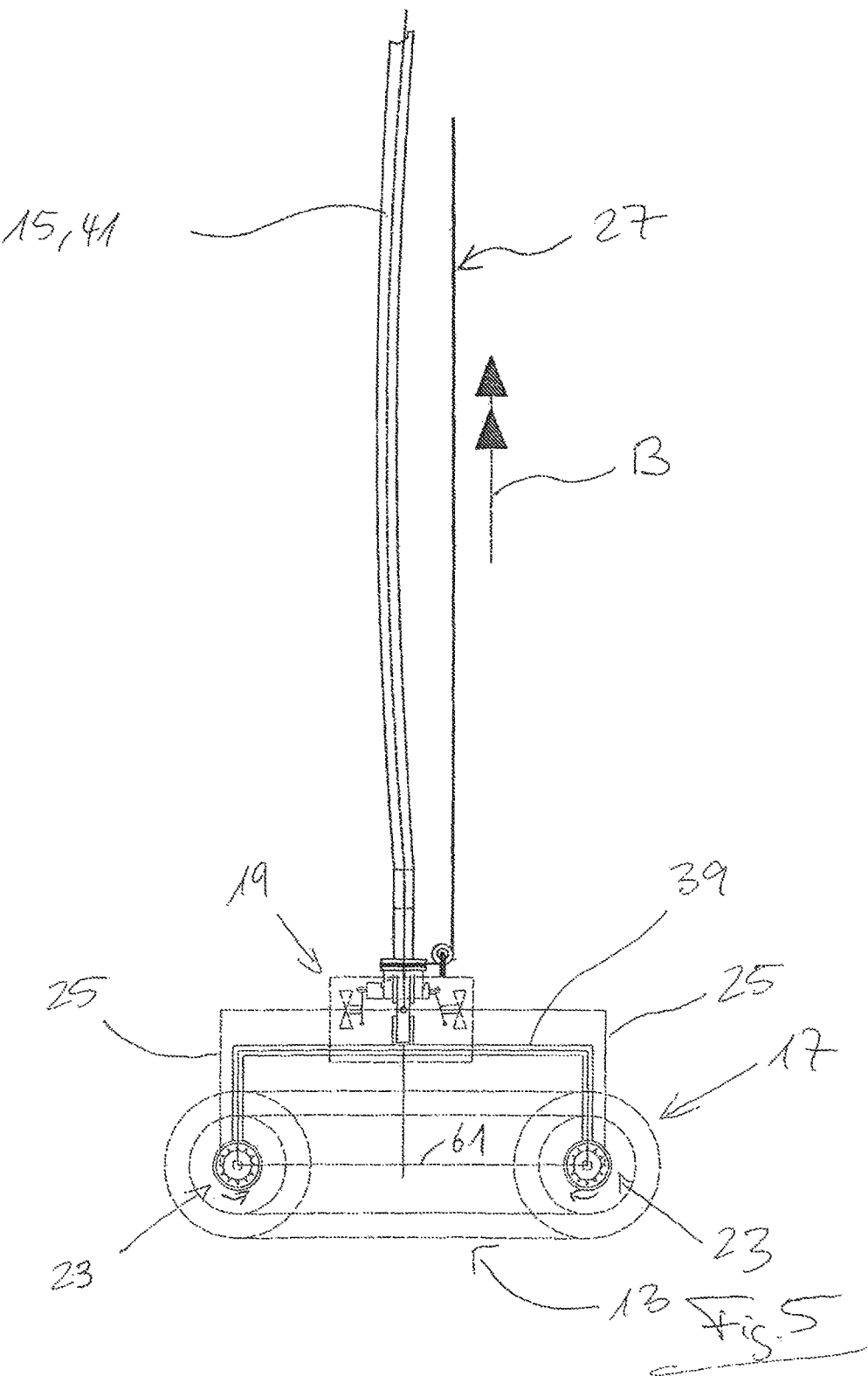

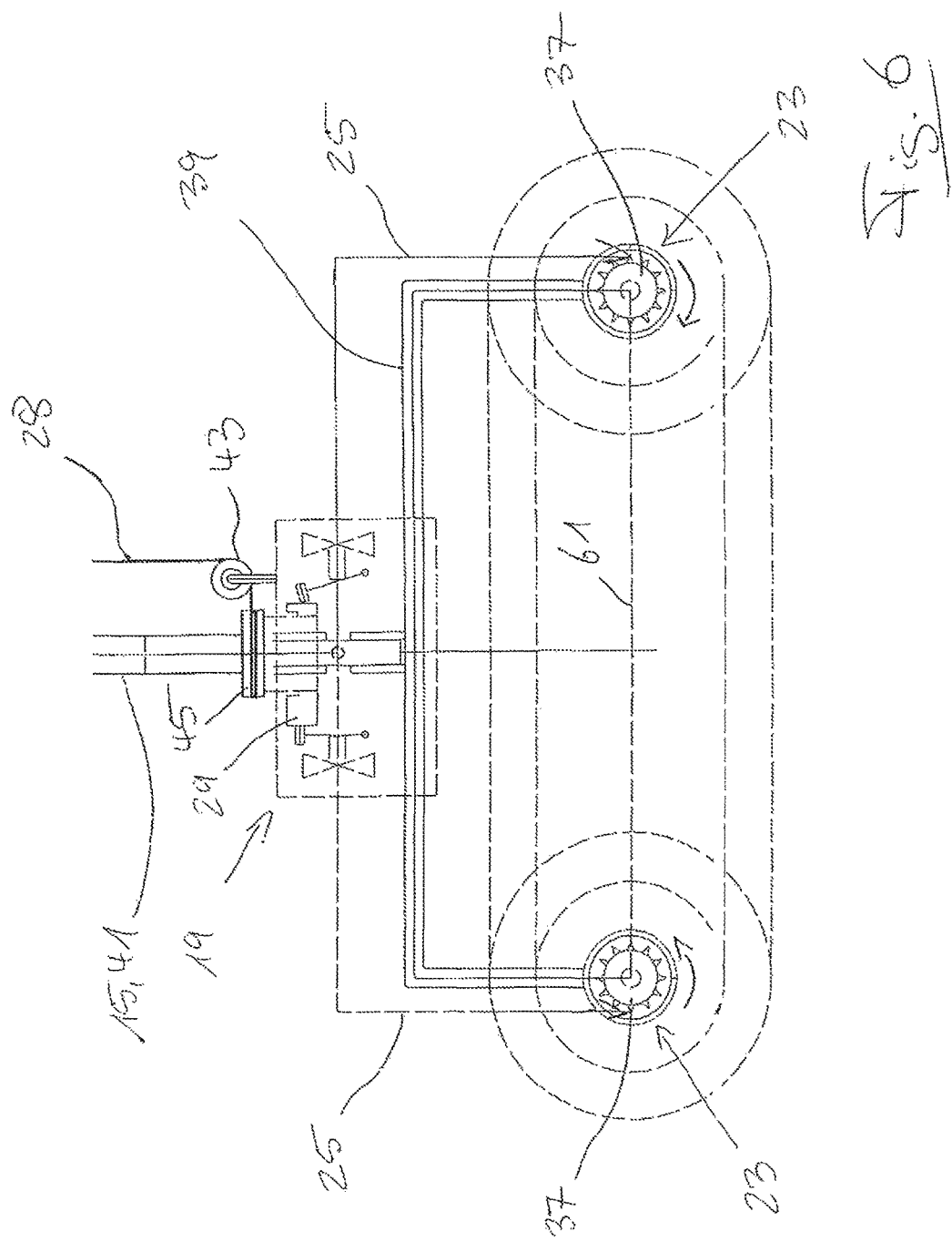

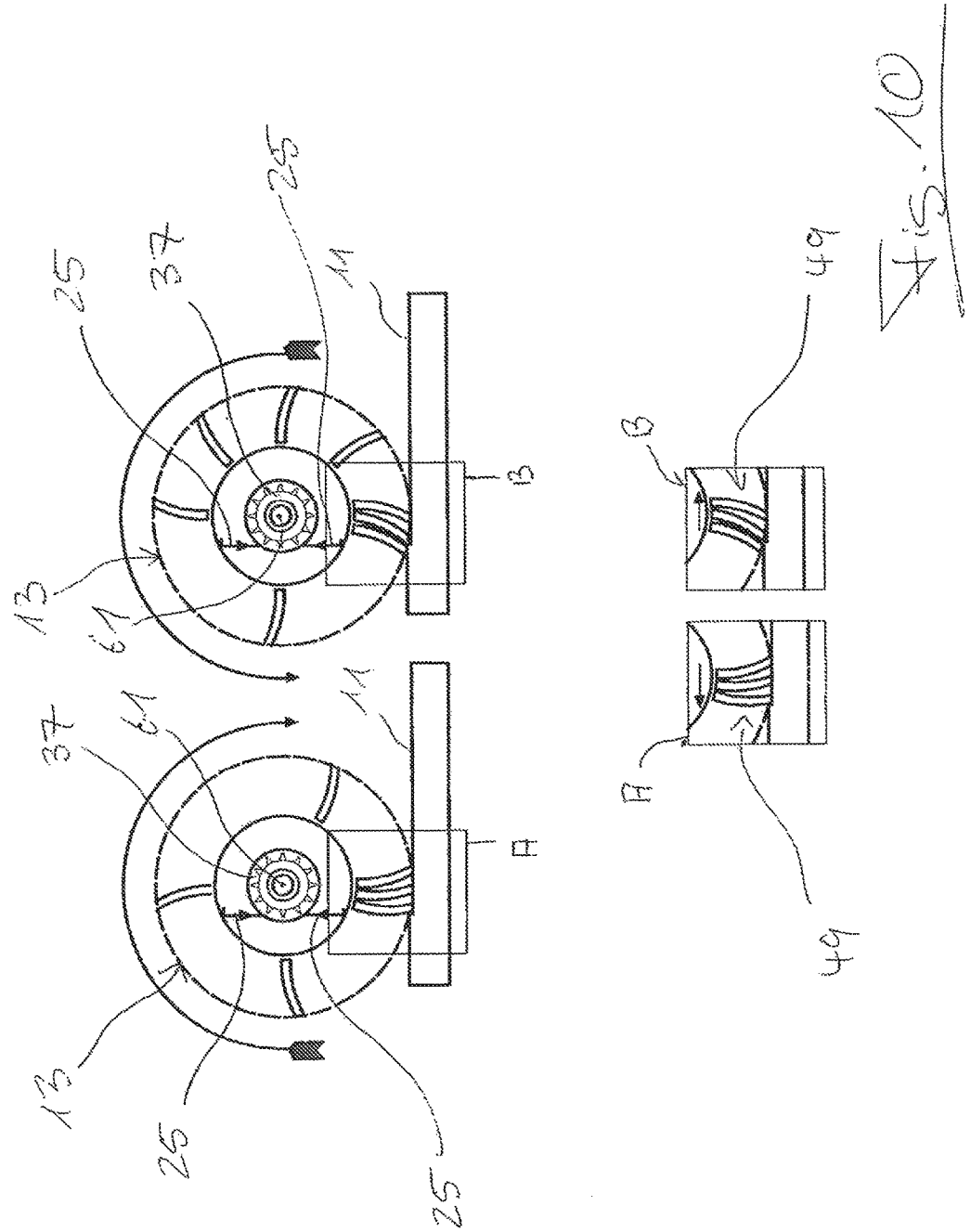

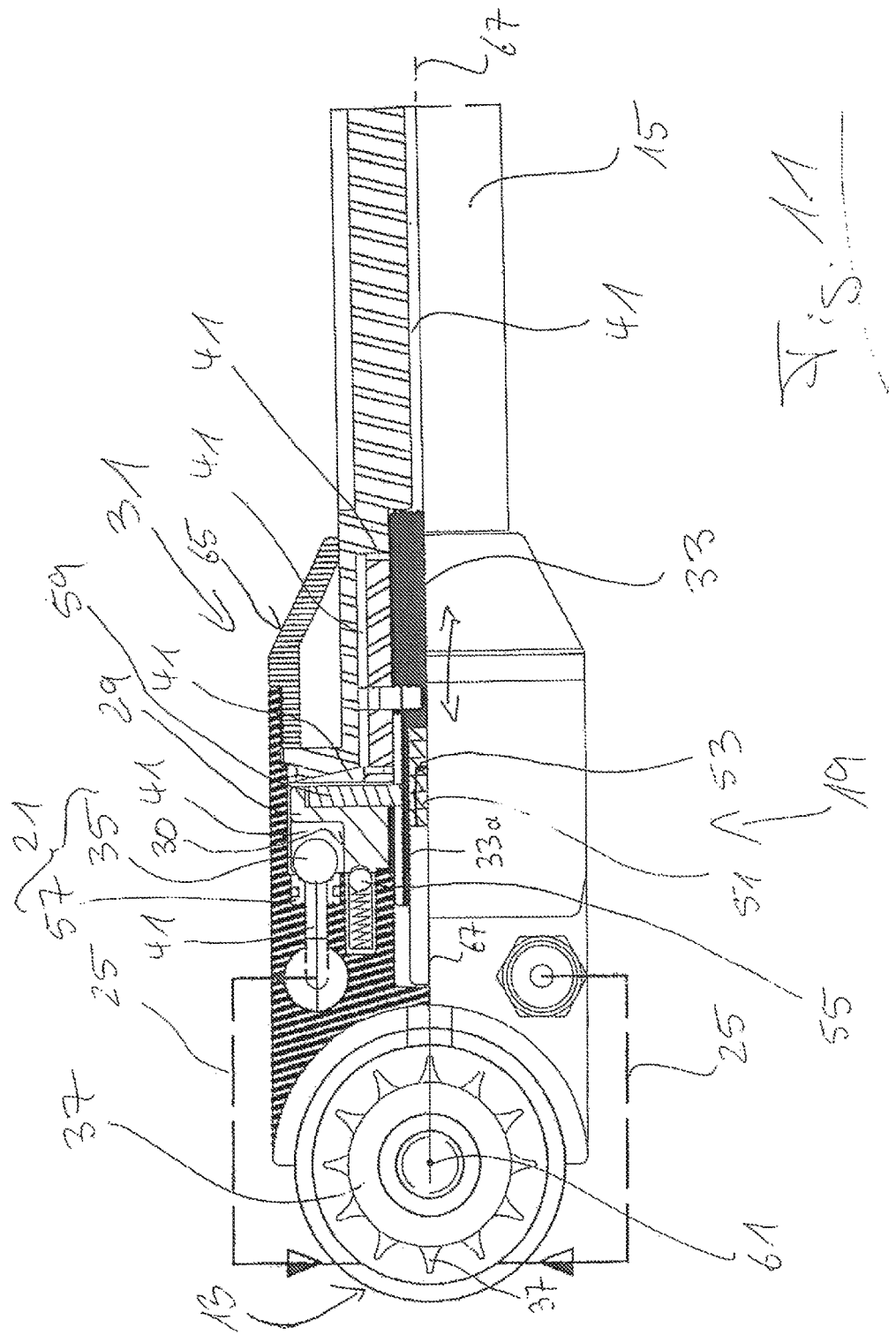

APPARATUS FOR CLEANING SURFACES

Figure 1:
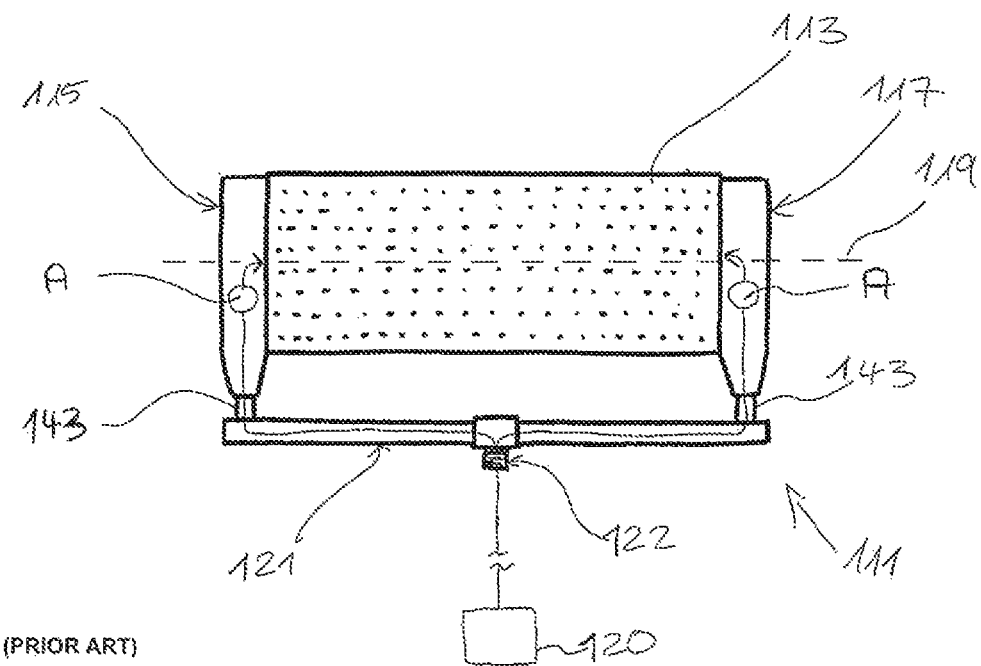

The invention relates an apparatus for cleaning surfaces, in particular of solar collectors and/or of photovoltaic installations, having at least one moving, in particular rotating cleaning member, in particular a brush roller or a dish brush, having a holding device for the cleaning member and having a fluid drive for the cleaning member.

Such apparatus are generally known, for example from DE 10 2010 018 011 A1 or from DE 10 2011 103 537 A1. The fluid drive for such a cleaning apparatus can accordingly comprise one or more turbine wheels or impellers which are acted on by a supplied fluid, in particular water, in order in this manner to convert the flow energy of the fluid supplied at pressure into the cleaning movement of the cleaning member which is directly or indirectly coupled to the turbine wheel or impeller or to one of the turbine wheels or impellers.

There is a need to expand the deployment options of such apparatus.

This object is satisfied in accordance with the invention in that the fluid drive is configured such that it is operable in different states, wherein a switching device is provided by which it is possible to change between the different operating states of the fluid drive.

Situations in particular occur again and again in practice in the cleaning of, for example, solar collectors and/or photovoltaic installations attached to sloped roofs in which it is advantageous for the user if he can vary the cleaning movement of the cleaning member in order, for example, to allow a cylindrical brush roller rotating about its central axis to rotate—viewed from the user—either forward or backward. Transitions between the panels of solar collectors or of a photovoltaic installation can, for example, be effectively and at least substantially completely freed of dirt by a temporary reversal of the direction of rotation of a cleaning brush rotating during operation. It can furthermore be necessary in practice to interrupt the cleaning movement temporarily, for example to stop a rotating brush roller briefly in order subsequently to restart the cleaning operation.

On the basis of its switching device, the cleaning apparatus in accordance with the invention allows the user to combat such situations which occur in practice in a simple manner. A rotating brush roller can, for example, be simply temporarily stopped by the user by actuating the switching device or can be operated with a reversed direction of rotation. The deployment possibilities of cleaning apparatus of the kind under consideration here are thus expanded in an advantageous manner by the invention.

Further developments of the invention are set forth in the following description and in the independent claims and in the enclosed drawing.

As already indicated above, two operating states of the fluid drive can be distinguished from one another with respect to the direction of movement of the cleaning member, in particular with respect to the sense or rotation of the cleaning member.

The fluid drive can furthermore be active in at least one of the operating states and can be interrupted in another one of the operating states.

In accordance with a further embodiment, the switching device is arranged between a fluid supply and a cleaning member in the flow path of the fluid. This concept of the arrangement of the switching device provides a plurality of particularly advantageous possibilities of changing the operating state of the fluid drive. At least a part of the switching device is in particular flowed through by the fluid.

Provision can furthermore be made that the switching device can be brought into different switching configurations, with there being an association between the switching configurations of the switching device and the operating states of the fluid drive. If, for example, the switching device has a plurality of switchable valves, different relative positions of the valves can then each form a switching configuration among one anther which corresponds to an operating state of the fluid drive.

Provision can be made against this background that the switching configurations of the switching device are defined by positions of one or more switching members, in particular valves.

The concept of a switching device in accordance with the invention is particularly advantageous when the fluid drive comprises one or more drive units and at least one fluid path leads to each drive unit, with each fluid path being either releasable or closable by means of the switching device.

In a first variant of this concept, the fluid drive comprises at least one drive unit to which at least two fluid paths lead, with a first fluid path being released and a second fluid path being closed in a first operating state and with the first fluid path being closed and the second fluid path being released in a second operating state. In this variant, for example, a single turbine wheel or impeller can be provided for a cylindrical brush roller, said turbine wheel or impeller being acted on in different manners by means of the two fluid paths, and indeed such that different directions of rotation are present.

In a second variant, the fluid drive can comprise at least two drive units to which a respective at least one fluid path leads, with the fluid path to a first drive unit being released and the fluid path to a second drive unit being closed in a first operating state and with the fluid path to the first drive unit being closed and the fluid path to the second drive unit being released in a second operating state.

Whereas a single drive unit can implement a plurality of operating states in the first variant, a split of the operating states between two or more drive units can so-to-say take place in this second variant which are then selectively each acted on or not acted on by a corresponding release or closure of the fluid paths. This second variant can, for example, be implemented such that a respective drive unit is arranged at each of the two end faces of a cylindrical brush roller, wherein, however, only a respective one of the two drive units is active and drives the brush roller during the cleaning operation, whereas the respective other drive unit is deactivated or interrupted and in particular at most serves to hold the brush roller at the end face.

As already indicated above, the switching device can in accordance with the invention comprise a valve arrangement.

Provision can be made in this respect that the switching device comprises at least one valve which is associated with at least one fluid path and which is adjustable between a release position and a closed position.

Provision is furthermore made in accordance with the invention that an actuation device is provided for the switching device by means of which the switching device can be brought into different switching configurations.

In a preferred embodiment, the actuation device is only operable mechanically. No external energy is required for this purpose so that a corresponding cleaning apparatus can be manufactured particularly inexpensively and can be set up and operated with little effort.

It is nevertheless possible in accordance with the invention to provide an electrical or electromechanical switching device which is provided with its own energy source such as a rechargeable battery and which can be controlled by the user by a wireless remote control.

Provision is made in a further embodiment that an adjustment movement of an adjustment member at least changing the switching configuration can be effected by means of the actuation device.

A valve arrangement of the switching device can be acted on by means of the adjustment member. Provision can in particular be made in this respect that a plurality of valves of the valve arrangement can be adjusted by means of an adjustment movement of the adjustment member.

The adjustment movement of the adjustment member can be a rotational movement. This is, however, not compulsory. Linear movements of an adjustment member, for example movements to and fro, can also be provided for the adjustment member.

The adjustment movement of the adjustment member can be effectible by a rotational movement of the actuation device which in particular takes place manually. The user can thus, for example, rotate a holding bar for the cleaning member, with the holding bar in particular being a multi-part and/or telescopically configured holding bar.

Alternatively or additionally, an adjustment movement of the adjustment member can be effectable by a pulling movement, by a pushing movement or by a pressing movement, which each in particular takes place manually. Such an adjustment movement can extend at least partly and at least approximately in parallel with the holding device.

The actuation movement can generally be able to be converted independently of its type into a different and/or into a differently oriented adjustment movement of the adjustment member. A pull cable at which the user pulls to change the operating state of the fluid drive can thus be deflected and coupled to the adjustment member, for example, such that the adjustment member is set into a rotational movement by pulling at the pull cable.

In accordance with a further embodiment of the invention, the actuation device can comprise a pulse control for the switching device. This concept makes it possible to utilize fluid supplied in a pressurized state for switching between the operating states of the fluid drive.

A pulse control, however, does not necessarily have to use the fluid or the fluid pressure or changes of the fluid pressure. A specifically provided length variability of the holding device can thus, for example, also be provided for a pulse control, wherein the user brings about a length change, in particular abruptly, in particular a shortening, and wherein this change is converted into an adjustment movement. A spring path can e.g. be integrated into a holding bar or a holding cable or holding hose can be provided with an elastically deformable bulge, in particular a spring-assisted bulge. In this respect, in particular the inertial mass of the holding device and/or of the cleaning member which is held by the holding device, in particular against the effect of gravity, can be used to bring out the length change against the restoring force of the spring path which subsequently automatically provides the restoration of the starting state.

The pulse control can comprise an actuation mechanism which acts in the manner of a ratchet or catch and with which a to-and-fro movement of an actuation mechanism can be converted into an adjustment movement of an adjustment member.

The fluid supply can be changeable in time for the pulse control. This time change of the fluid supply can in particular be implemented by interrupting and releasing the fluid supply.

A preferred embodiment provides that the pulse control is configured to effect an adjustment movement of an adjustment member at a fluid pressure which is smaller than the operating fluid pressure, in particular with an interrupted fluid supply, i.e. in the pressureless state. It is hereby insured that a switching process does not have to take place at too high a fluid pressure. The switching process can in particular take place with an at least substantially pressureless switching device so that only relatively small switching forces are required.

The pulse control can comprise an actuation member which is held in a first position against a restoring force by the supplied fluid with a released fluid supply and which is movable into a second position by the restoring force by an interruption of the fluid supply, wherein the movement from the first position into the second position can be converted into an adjustment movement of an adjustment member.

In this concept, the pressurized fluid is used to store energy by the work against the restoring force and the energy then automatically resets the actuation member on a reduction or removal of the fluid pressure and thereby effects the switching process in the pressure-reduced or pressureless state.

The adjustment member of the switching device can comprise a plurality of switching zones which each either release or close a fluid path on an alignment with this fluid path leading to a drive unit of the fluid drive. A movable closing element which is movable into a closed position and is held therein by the fluid can be provided at at least one of the switching zones communicating with the fluid supply.

Such an adjustment member can, for example, be rotatably supported and can be moved step-wise by means of a pulse control. With such a rotary switch, the switching zones can be successively coupled to the fluid path or paths such that a respective fluid path is either released or closed in dependence on the rotary position of the adjustment member. A closing element of the adjustment member can form a valve together with a valve seat in the corresponding rotary position of the adjustment member, said valve always being closed when the fluid pressure is applied to the switching zone. The respective fluid path is released when, subsequent to a switching process, a switching zone not provided with a closing element is brought into alignment with the respective fluid path. A ball which forms a ball valve closable by the fluid pressure together with the valve seat can be provided as a closing element. Slide valves can e.g. alternatively be provided. A movable part of the valve can generally respectively be provided at the switching zone and a valve seat can be associated with the fluid path and can e.g. be formed at a housing, with in principle, however, the converse arrangement also being possible, i.e. the switching zone forms the valve seat.

In accordance with an embodiment of the invention, the holding device can comprise at least one multi-part holding bar and/or a holding bar formed in the manner of a telescope. In an alternative embodiment, the holding device can comprise at least one flexible and/or bendable holding member, preferably formed as a fluid line, e.g. a hose simultaneously serving as a fluid supply line or a rope.

Cleaning devices provided with a holding bar can, for example, be held by a user from the floor and can be moved over the surface to be cleaned. The cleaning members can, however, also be let down, for example, from a respective inclined surface to be cleaned and pulled up and in so doing can be held by ropes or hoses.

As already initially mentioned, the fluid drive can be formed as a turbine drive or as an impeller drive.

The fluid drive can comprise at least one turbine wheel or impeller which can be set into rotation by means of a supplied fluid and whose rotation can be converted directly or indirectly, in particular via a transmission, into a movement, in particular into a rotation, of the cleaning member.

The turbine wheel or impeller can have an axis of rotation which extends offset in parallel with an axis of rotation of the cleaning member or coincides therewith.

As indicated above with respect to the generally possible setup of a cleaning apparatus in accordance with the invention, in a variant, a drive unit of the fluid drive can be arranged, in particular centrally, between at least two cleaning members which are movable together by means of the drive unit, with axes of rotation of the cleaning members in particular coinciding or extending offset in parallel with one another. Such a basic setup of the cleaning apparatus is known, for example, from the initially already mentioned DE 10 2011 103 537 A1.

In an alternative basic setup, at least one drive unit of the fluid drive can be arranged at the end face at a cleaning member which is in particular formed as a brush roller, with provision in particular being made that the drive unit holds the cleaning member at the end face. Such a basic setup is known per se, for example, from DE 10 2010 018 011 A1 likewise already named above.

Provision can generally be made in accordance with the invention that a plurality of drive units, in particular exactly two drive units, of the fluid drive are associated with the cleaning member.

In this respect, the cleaning member can either be driven by at least two drive units together for each of a plurality of different operating states or can be driven by different drive units in different operating states.

The plurality of drive units can generally act in accordance with the invention at different points of the cleaning member.

In a preferred embodiment, the cleaning member comprises a brush roller, with at least one drive unit, in particular a drive unit holding the brush roller at the end face, being arranged at each end face of the brush roller. This concept is known per se from the above-named DE 10 2010 018 011 A1.

Figure 2A:
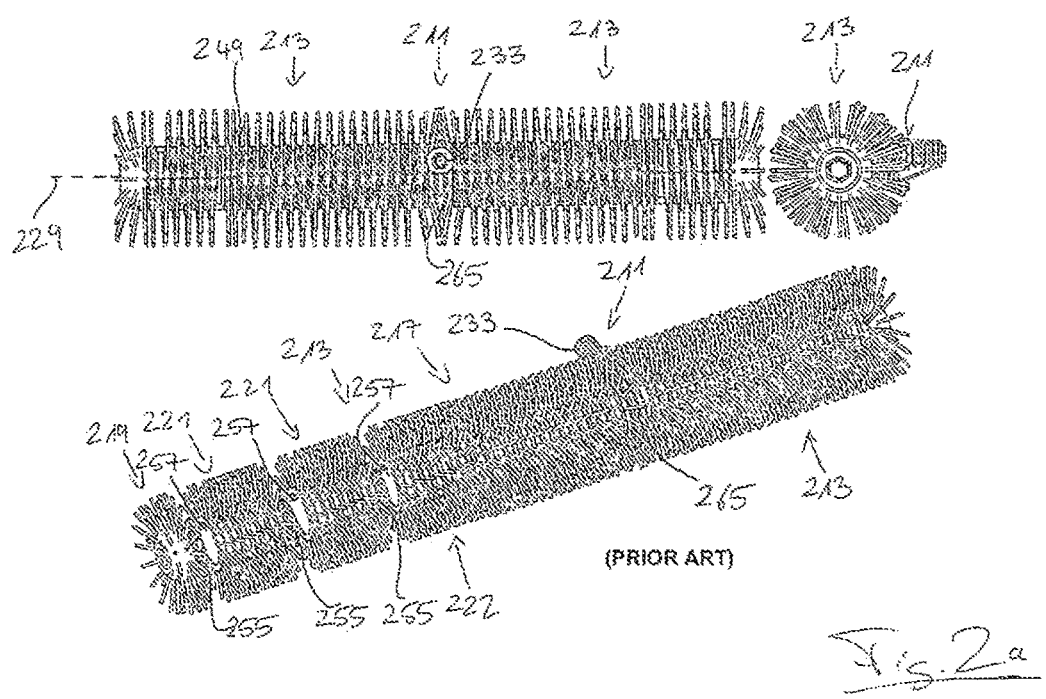
Figure 2B:
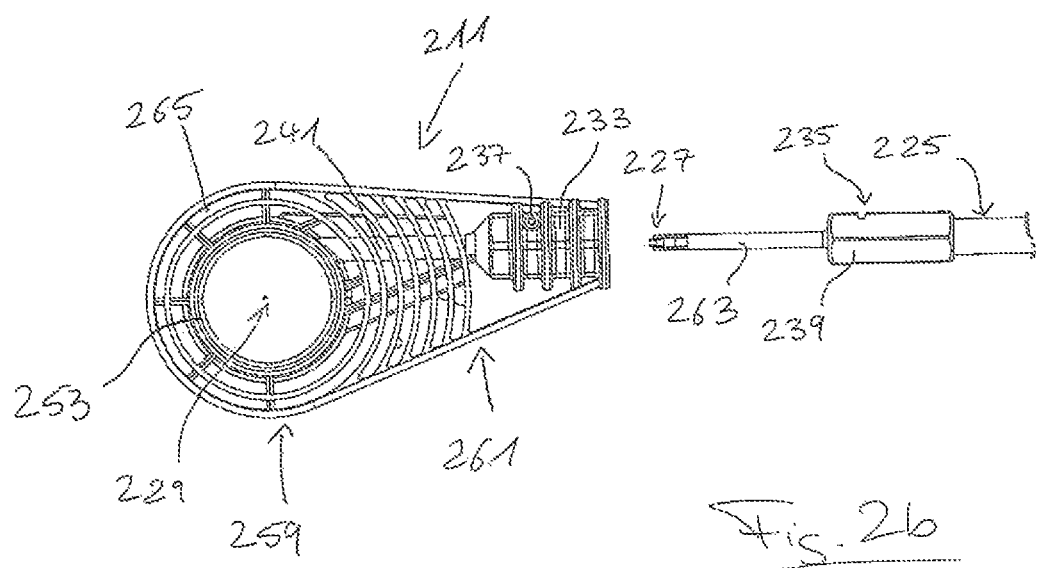
Figure 7:
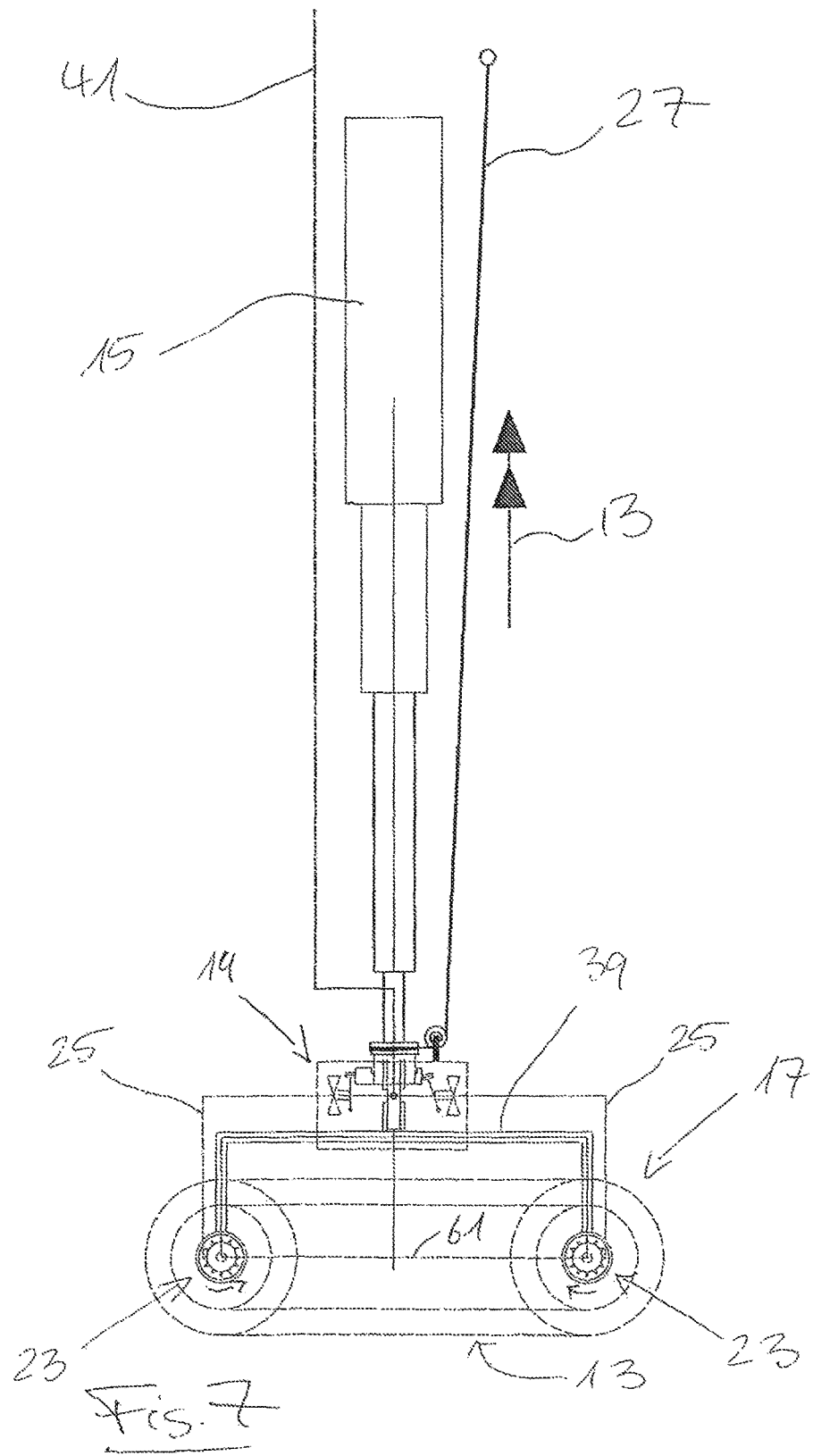
Figure 8:
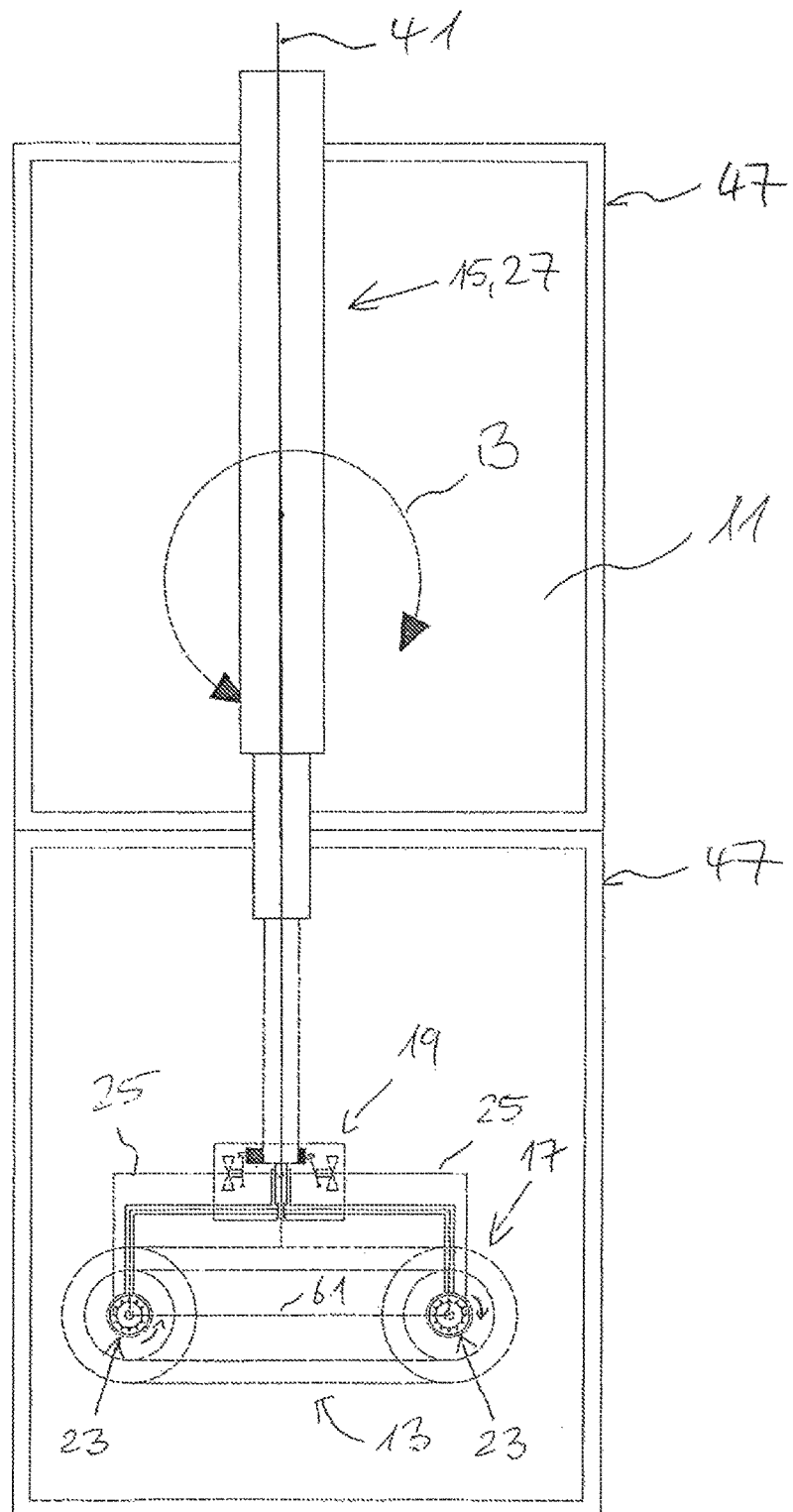
Figure 9:
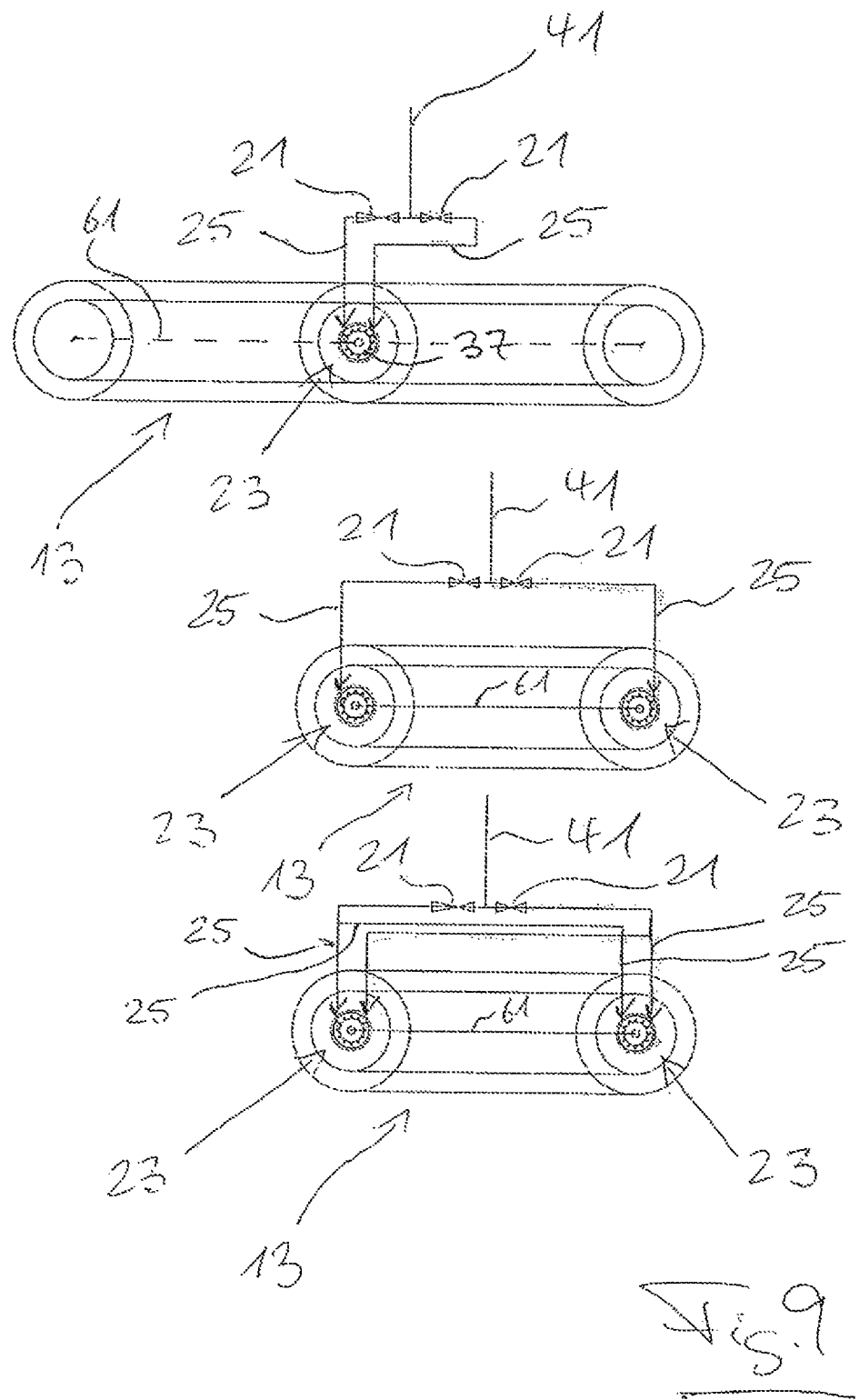

The invention will be described in the following by way of example with reference to the drawing; there are shown:

FIG. 1 a cleaning apparatus in accordance with the prior art;

FIGS. 2a and 2b a further cleaning apparatus in accordance with the prior art;

FIG. 3 schematically, a cleaning apparatus in accordance with the invention;

FIG. 4 an enlarged detail of FIG. 3;

FIG. 5 schematically, a further embodiment of a cleaning apparatus in accordance with the invention;

FIG. 6 an enlarged detail of FIG. 5;

FIG. 7 schematically, a further embodiment of a cleaning apparatus in accordance with the invention;

FIG. 8 schematically, the cleaning apparatus of FIG. 3 at an object to be cleaned;

FIG. 9 three schematic representations for explaining different fluid drive concepts in accordance with the invention;

FIG. 10 schematically, brush rollers operated with different senses of rotation at an object to be cleaned; and FIG. 11 schematically, an embodiment in accordance with the invention of a cleaning apparatus with impulse control for the switching device.

FIG. 1 shows a cleaning apparatus such as is described in the initially already named DE 10 2010 018 011 A1 and which has a basic setup which will be explained in the following and which can also be provided for cleaning apparatus in accordance with the invention.

The cleaning apparatus shown in FIG. 1 comprises a cylindrical cleaning roller which is provided at its peripheral surface with a piece of equipment tailored to the respective cleaning purpose, for example with bristles. In addition, outlet openings for a cleaning fluid, in particular water, are provided in the roller jacket which, for example, carries the bristles.

The holding and the rotary drive of the cleaning roller 113 take place by two drive units 115, 117 here. The drive units simultaneously serve as a fluid supply for the roller 113 and are for this purpose connected via connectors 143 to a common holder 131 which extends in parallel with the axis of rotation 119 of the cleaning roller 113. Together with the holder 121, the two drive units 115, 117 form a carrier 111 for the cleaning roller 113.

The holder 121 is in particular connectable to a commercial high-pressure cleaner 120 via a connector 122 so that the cleaning apparatus is also interesting for domestic households.

The flow path of the cleaning fluid through the holder 121 and through the drive units 115, 117 into the interior of the cleaning roller 113 is indicated by the arrows in FIG. 1. It is indicated in each case by "A" in the drive units 115, 117 that the cleaning fluid carries out work there to the extent that kinetic energy is removed from it in a turbine not explained in any more detail here in order hereby to realize a rotary drive of the cleaning roller 113.

The drive units 115, 117 in each case in this respect each satisfy a threefold function in that they hold and rotatably support the cleaning roller 113, provide the supply of the fluid into the interior of the cleaning roller 113 and additionally realize the rotary drive for the cleaning roller 113.

The holder and the rotary support of the cleaning roller 113 can be provided solely by the drive units 115, 117 so-to-say forming the "tines" of a carrier 111 in a fork-like form overall. The holding and/or support function for the cleaning roller 113 can, however, at least partly also be realized in another manner, for example by means of transverse braces which pass through the cleaning roller 113 and which provide the required or the additional stability or strength. It is, however, possible, with a correspondingly stable design of the transverse carrier 121 to hold the cleaning roller 113 only by means of the two drive units 115, 117 engaging at the end face and to support it about the axis of rotation 119 with respect to the rotation.

The diameter of the cleaning roller 113 is, for example, at around 200 mm, which has been found in particular to be especially suitable for the cleaning of solar collector surfaces or photovoltaic installation surfaces. Different working widths, i.e. dimensions of the cleaning roller 113 along its longitudinal axis 119, can be realized without problem by the described setup of the cleaning apparatus, said working width being, for example, between approximately 500 mm and 1000 mm. A matching of the cleaning apparatus to the usual field sizes of solar collectors or photovoltaic installations can hereby take place in an advantageous manner. Furthermore, for example with a sufficient length of the holder 121, an adjustability of the two drive units 115, 117 engaging at the end face provided in the longitudinal direction of the holder 121 can be provided which serves to be able to receive cleaning rollers 113 of different lengths with one and the same apparatus.

Reference is made to the further content of DE 10 2010 018 011 A1 with respect to a possible setup of the drive units 115, 117.

A further cleaning apparatus known from the prior art, namely the already mentioned DE 10 2011 103 537 A1, is shown in FIGS. 2a and 2b. The basic setup of this known cleaning apparatus explained in the following can also be provided in cleaning apparatus in accordance with the invention.

FIG. 2a shows an embodiment of a double brush or twin-brush of a known cleaning apparatus which comprises two brush arrangements 213 which are arranged at both sides of a base part 211 and are connected to the base part 211 such that a fluid drive (not shown in FIG. 2a) integrated into the base part 211 can set both brush arrangements 213 simultaneously into a cleaning motion with the same sense of rotation, said cleaning motion being a rotational movement about a common axis of rotation 229.

FIG. 2a in particular shows a modular setup of the brush arrangements 213 which serves to match the working width of the cleaning apparatus to the respective application. In the embodiment shown, each brush arrangement 213 comprises a base module 217, two intermediate modules 221 and an end module 219.

Since the fluid drive and the base part 211 are designed such that fluid flowing into the base part 211 via a receiving section 233 explained in more detail in the following flows into the interior of an outer jacket 249 of the brush arrangement 213 provided with bristles after leaving the fluid drive in order there to exit via outlet openings, not shown, at the periphery of the outer jacket 249 and the end module 2319 is axially closed at the end face to be able to wet the bristles or the object to be cleaned.

As FIG. 2b shows, the base part 211 comprises a cylindrical section 259 whose center axis coincides with the axis of rotation 229 of the brush arrangements 213 and which comprises an axially extending housing 253 for a fluid drive.

The base part 211 furthermore comprises a substantially radially projecting feed section 261 which comprises a leadthrough 241 extending tangentially with respect to the axis of rotation 229 as well as a receiving section 233 opening into the leadthrough 241 and having an enlarged cross-section.

The comparatively narrow leadthrough 241 serves for receiving a relatively thin, pen-shaped jet pipe section 263, whereas the receiving section 233 serves for receiving an extension 239 which is enlarged with respect to the diameter over the jet pipe section 263 and which merges into the jet pipe section 263 in the direction of flow of the fluid.

The jet pipe section 263 and the extension 239 are sections of a fluid supply line 225 at the end side which is in particular designed as a lance and via which the cleaning apparatus can be connected to a fluid pressure source, not shown, in particular to a commercial high-pressure cleaner.

In the embodiment shown, the end of the line 225 comprising the jet pipe 263 and the extension 239 extends tangentially to the axis of rotation 229 in the state plugged together with the base part 211.

The base part 211 is provided with a securing portion 237 in the region of the receiving section 233 which engages into a cut-out 235 of the extension 239 of the line 225 in the assembled state and prevents an unintentional pulling of the line 225 out of the base part 211.

A replaceable fluid expulsion member in the form of a nozzle element 227 is provided at the free end of the jet pipe 263. The outlet opening of the nozzle 227 serves as a fluid outlet which is aligned such that a turbine, not shown, of the fluid drive is acted on by a fluid jet. The mentioned fluid drive is arranged in that region of the cylindrical section 259 of the base part 211 which is surrounded by the housing 253.

The housing 253 is surrounded in a central region by a flat flange section 265 which is of the shape of a circular ring disk, which is connected to the cylindrical housing 253 in one piece and which projects radially from housing 253, with the feed section 261 starting from the flange section 265 in the radial direction. Both the flange section 265 and the feed section 261 are made extremely narrow or thin in the direction of the axis of rotation 229 to minimize the axial region between the two brush arrangements 213 taken up by the base part 211 (cf. FIG. 2a).

The base part 211 is preferably formed as a multicomponent element which comprises an inner reinforcement, in particular in the form of a metal sheet, whose flat sides are orientated perpendicular to the axis of rotation 229. This metal sheet can be overmolded with plastic to realize the desired shape or structure. Overall, an extremely stable and in particular flexurally rigid design can hereby be achieved for the base part 11, with this being made possible with a very low weight of the base part 11.

With respect to the embodiments of the invention described in the following, the respective cleaning member 13, the fluid drive 17, the drive unit or the drive units 23 of the fluid drive 17 and the supply of fluid, in particular water, to the fluid drive 17 illustrated by fluid paths 25, are shown in abstract form in order better to illustrate the respective drive concept. As mentioned above, the cleaning apparatus in accordance with the invention can each have a basic setup such as has been explained in connection with FIG. 1 and with FIGS. 2a and 2b.

The invention is characterized with respect to the above-explained prior art in that the fluid drive 17 can be operated in different states and in that a switching device is provided with which a change can be made between the different operating states of the fluid drive 17. The switching device 19 is also schematically indicated in the Figures explained in the following. The skilled person can, however, practically carry out the respective embodiment without problem using the Figures and the associated following description.

The cleaning member 13 is in each case a cylindrical brush roller which rotates about an axis of rotation 61 during operation. To illustrate the respective drive concept, the drive units 23 are each shown rotated by 90° so that the axes of rotation defined by the drive unit 23 are shown extending perpendicular to the axis of rotation 61. In the actual embodiment, axes of rotation defined by the drive units 23 and the axis of rotation 61 of the brush roller are either arranged offset in parallel with one another or coincide.

In the embodiment of FIGS. 3 and 4, the brush roller 13 is held at its two end faces by a respective a drive unit 23 of the fluid drive 17, which drive units are attached to the "tines" of a fork-like mechanical holder 39 or which form the "tines" of the fork-like holder 39. The basic setup of this embodiment in accordance with the invention consequently corresponds to that of FIG. 1.

The holder 39 furthermore serves as a rotary bearing 63 for a holding bar 15 which is here formed as telescopic and which is simultaneously configured as an actuation device 27 for a switching device 19.

A fluid supply line 41 extends in the interior of the telescopic bar 15 and branches in the region of the switching device 19 into two fluid paths 25 which each lead to one of the drive units 23.

As the enlarged detail of FIG. 4 shows, a turbine wheel or impeller 37 of the one drive unit 23 is acted on in one sense of rotation over the one fluid path 25, whereas an action on the drive unit 23 in the opposite sense takes place at the other end face of the brush roller 13, as is indicated by the arrows.

Only a respective one of the two fluid paths 25 is released during the cleaning operation so that the brush roller 13 is only actively driven by one of the to drive units 23 and is only held by the respective other drive unit 23 such that the brush roller 13 can rotate. The brush roller 13 rotates either forward or backward depending on which drive unit 23 is acted on, i.e. which fluid path 25 is released.

A respective one of a plurality of different switching configurations of the switching device 19 corresponds to these operating states of the fluid drive 17, with this switching configuration being realized by different relative positions of valves 21. It is schematically indicated that an eccentric disk 29 serving as an adjustment member cooperates with the two valves 21, the eccentric disk being attached to the telescopic bar 15 and being able to be rotated relative to the valve arrangement 21 of the switching device 19 by a rotation of the holding bar 15 simultaneously serving as an actuation device 27 to effect different valve positions in this manner.

One of the valves 21 is in a closed position, whereas the other valve 21 adopts a release position in dependence on the rotational position of the eccentric disk 29.

The user can let the brush roller 13 rotate either forward or backward by means of the fluid drive 17 in this manner by rotating the holding bar 15.

This switch and/or actuation concept allows a simple implementation of additional operating states. The adjustment member 29 can thus, for example, be configured such that both valves 21 are closed in at least one rotational position of the holding bar 15. No fluid arrives at the two drive units 23 via the two fluid paths 25 in this operating state, i.e. the brush roller 13 does not rotate. Provision can alternatively be made in such a configuration of the switching device that the supplied water is utilized in a different manner in that it is, for example, applied to the respective surface to be cleaned by a flat jet nozzle or by a point jet nozzle in order, for example, to eliminate stubborn contaminants. Such a flat jet nozzle or point jet nozzle is in particular arranged such that the exiting water jet arrives at the surface to be cleaned past the brush roller 13.

Alternatively or additionally to such a jet operation, an operating state and thus a rotational position of the holding bar 15 can be provided in which the water is only expelled at low pressure. Such a low-pressure operation can be used, for example, for a flushing away of contaminants or cleaning agent residues. A further alternative or additional rotational position of the holding bar 15 can serve to suck in an additive from a store, not shown, which additive is applied together with the supplied water to the drive units 23 or directly onto the surface to be cleaned, for example via a jet nozzle.

The switchover concept in accordance with the invention thus allows the realization of a multifunctional cleaning apparatus in a simple and reliable manner.

While the above-explained cleaning brush 13 can be moved to and fro over the respective surface to be cleaned by the user via the telescopic bar 15, FIGS. 5 and 6 show an embodiment in which no rigid holding device is provided, but rather a fluid supply hose which serves simultaneously as a holding member 15 and as a fluid supply line 41. Such a cleaning apparatus is in particular used when the cleaning brush 13 can be let down at an inclined surface to be cleaned while using gravity, with the cleaning brush being able to be held firmly with the fluid supply line 41 or with the inclined surface being able to be pulled up.

It is also possible with such a concept for holding the brush roller 13 accordingly to actuate a switching device 19 again having two valves 21 here. An example for such an actuation is shown in FIGS. 5 and 6. The actuation device here comprises a pull rope 28 which is deflected by 90° by means of a deflection roll 43 from an extent extending in parallel with the fluid supply line 41 and is wound up onto a rotary carrier 95.

By pulling at the pull rope 28, the rotary carrier 45 rotatably supported relative to the fluid supply line 41 can be set into rotation by a user together with a rotationally fixedly attached eccentric disk 29, whereby in turn, corresponding to the embodiment of FIGS. 3 and 4, one of the provided configurations of the switching device 19 can be established and a change can thus be made into the respectively desired operating state of the fluid drive 17.

In this respect, it can be achieved by suitable means that after a pulling actuation of the pull rope 28 and thus subsequent to a switching process, a return mechanism pulls the pull rope 28 back in without the switching procedure being reversed so that a further adjustment movement of the eccentric disk 29 is initiated by a new pulling actuation of the pull rope 28 to effect the next switching configuration of the switching device 19 and thus to change into the next operating state of the fluid drive 17.

An actuation mechanism which acts in the manner of a ratchet or catch can in particular be provided to realize such an actuation of the switching device.

Whereas in the two previously explained embodiments the water is respectively supplied within the holding device 15 (holding bar or hose) and to this extent "internally", FIG. 7 illustrates the possibility of an external fluid supply via a fluid supply line 41 extending outside the holding device 15. FIG. 7 additionally shows that, in accordance with the invention, the use of a pull rope mechanism for actuating the switching device 19 is not restricted to the use of a flexible or bendable holding member, for example in the form of a fluid hose, in accordance with the embodiment of FIGS. 5 and 6. Such an actuation mechanism can rather also be used in combination with a holding bar, here in the embodiment of FIG. 7 with a telescopic bar, corresponding to the embodiment of FIGS. 3 and 4. In the embodiment of FIG. 7, the holding bar 15 thus does not serve as an actuation device 27 as is the case in the embodiment of FIGS. 3 and 4 in which the actuation movement B is a rotational movement of the holding bar 15, whereas in the other of the two embodiments the actuation movement B is a pulling movement in parallel with the longitudinal extent of the holding member 15 formed as a fluid hose here.

FIG. 8 shows the cleaning apparatus in the embodiment in accordance with FIGS. 3 and 4 at a surface 11 to be cleaned which is formed by a plurality of panels 47 of solar collectors or of a photovoltaic installation. Transitions can be located between such panels 47 for whose cleaning the cleaning apparatus in accordance with the invention is particularly advantageous which will be looked at in more detail in the following.

FIG. 9 illustrates a plurality of possible drive concepts in accordance with the invention.

The upper representation in FIG. 9 illustrates a cleaning apparatus having a basic structure known per se in accordance with FIGS. 2a and 2b having a drive unit 23 which is arranged centrally between two brush rollers together forming the cleaning member 13. The fluid supply line 41 branches into two fluid paths 25 which both lead to the same turbine wheel or impeller 37 of the drive unit 23, but with the respective fluid expulsion members or fluid expulsion nozzles or fluid outlet openings of the fluid paths 25 being arranged and/or aligned such that they can apply different senses of rotation to the turbine wheel or impeller 37. Either the one or the other fluid path 25 can be released by a corresponding action on the valves 21 and the direction of rotation of the brush rollers which are driven simultaneously by the drive unit 23 can be fixed as desired.

The middle representation in FIG. 9 illustrates the drive concept explained in connection with the above embodiments in accordance with the invention in which a brush roller is held at the end face by two drive units 23 and is thus driven at the end face. Only one fluid path 25 leads to each of the two drive units 23 so that a respective only one of the two drive units 23 is active, and thus drives the brush roller 13 alone, during a cleaning operation in dependence on the switching configuration of the switching device comprising the valves 21.

The lower representation of FIG. 9 illustrates a drive concept in which, starting from the embodiment in accordance with the middle representation in FIG. 9, each fluid path 25 branches, viewed in the direction of flow, behind the respective valve 21 so that two fluid paths 25 lead to each drive unit 23 and a situation corresponding to the drive concept of the upper representation in FIG. 9 is consequently present for each drive unit 23. The brush roller 13 is thus driven in each case by both drive units 23 together for each direction of rotation, the two drive units then each rotating with the same sense of rotation.

FIG. 10 illustrates the effect of brush rollers 13 driven with different senses of rotation on the cleaning of a surface 11. The fluid path 25 coming from below is released in the left part of the representation in FIG. 10 with the enlarged detail A so that the turbine wheel or impeller 37 and thus the brush roller 13 rotate clockwise about the axis of rotation 61. The circumstances are reversed in the right part of the illustration in FIG. 10, i.e. the fluid path 25 coming from above is released so that the brush roller 13 rotates counter-clockwise.

It can be seen from the comparison of the positions of the bristles 49 of the brush roller 13 for the two opposite direction of rotation that a change of the direction of rotation of the brush roller 13 is advantageous in the regions of transitions, in particular of step shape, in the surface 11 to be cleaned, such as at transitions between adjacent panels 47 (cf. FIG. 8), to be able also to ideally clean such transitions.

FIG. 11 shows in schematic form an embodiment in which a pulse control 31 is provided for the switching device 19. The switching device 19 and the pulse control 31, which can together be called a pulse circuit, are accommodated in a housing 65 from which two fluid paths 25 emanate which both lead to the same turbine wheel or impeller 37 of a drive unit in order e.g. to realize a drive concept in accordance with the upper representation in FIG. 9.

A cylindrical adjustment member 29 in the form of a cage rotor is rotatably supported about an axis of rotation 67 in the housing 65, in which cage rotor a plurality of chambers 30 are formed which are arranged distributed in the peripheral direction and which each form a switching zone. Each chamber 30 is part of a fluid supply line 41 which leads via a holding device 15 of generally any desired design and provided here in the form of a holding bar and through the transition between the holding device 15 and the housing 65 to a valve seat 57 and finally to the fluid path 25 when the cage rotor 29 is in the corresponding rotational position in which the respective chamber 30 is aligned with the respective valve seat 57.

The arrangement is selected such that each fluid path 25 and thus each valve seat 57 is aligned with one of the chambers 30 in each rotational position of the cage rotor 29.

Depending on the specific application, a respective closing element 35, formed as a ball here, is captured in one of the chambers 30 or in a plurality of chambers 30, the closing element forming a valve 21 for the respective fluid path 25 together with the respective valve seat 57. If a chamber 30 with a ball 35 captured therein is aligned with a valve seat 57 and thus with the corresponding fluid path 25, the fluid pressure present in the chamber 30 provides that the ball 35 in the valve seat 57 and thus this valve 21 is held permanently in the closed position as long as the rotational position of the cage rotor 29 does not change.

The distribution of the balls 35 in the chambers 30 is selected such that the other fluid path 25, the lower one in FIG. 11, is released when—as shown—the fluid path 25 at the top in FIG. 11 is closed by the valve 21. The chamber 30 aligned with the lower fluid path 25 is consequently not provided with a ball 35 so that the fluid can flow without impediment through the fluid feed line 41 into the lower fluid path 25 and can act on the turbine wheel or impeller 37 from below so that the brush roller 13 rotates clockwise.

It must be mentioned in principle at this point that at least those turbine wheels or impellers 37 to which two respectively selectively releasable or closable fluid paths lead are provided with symmetrical buckets 37a such that they can be acted on by fluid both from the one direction and from the other direction to be able to effect a rotary drive with both directions of rotation.

To change the operating state of the fluid drive, i.e. to initiate an adjustment movement of the cage rotor 29, the pulse control 31 comprises an actuation mechanism active in the manner of a ratchet or catch. A linear to-and-fro movement of an actuation member formed as a piston 33 is converted into a rotational movement of the cage rotor 29. FIG. 11 shows the pressureless state of the arrangement in which the piston 33 is driven to the right by a compression spring 51 in FIG. 11. If the fluid supply line 41 is pressurized, the piston 33 moves against the restoring force of the spring 51 to the left up to an abutment 53.

On this movement of the piston 33, which so-to-say represents a "counter-movement", a cam section 59 of the cage rotor 29 is not acted on by an actuation section 33a of the piston, i.e. the switching state of the switching device 19 and thus the direction of rotation of the brush roller 13 does not change on the pressurizing of the fluid supply line 41. A spring-loaded latch ball 55 holds the cage rotor 29 in the respective rotational position.

To trigger a switching process, the user interrupts the supply of fluid into the line 41 at a holding region, not shown, of the holding device 15 disposed remote from the brush roller 13, whereupon the piston 33 moves to the right in FIG. 11 due to the restoring force of the spring 51.

The actuation section 33a of the piston 33 cooperates with the cam section 59 on this movement of the piston 33 such that the cage rotor 29 is rotated against the restoring force of the spring-loaded latch ball 55 into the next rotational position in which the latch ball 55 again latches into the cage rotor 29. In this respect, the upper valve seat 57 in FIG. 11 is aligned with an empty chamber 30 and the lower valve seat, not shown, in FIG. 11 is aligned with a chamber 30 containing a ball 35. In this operating state, the turbine wheel or impeller 37 is acted on from above with a fluid jet via the respective fluid path 25 so that the brush roller 13 rotates counter-clockwise.

With this remote pulse control, a user only has to briefly interrupt the fluid supply to trigger a switching process. This concept has the advantage that the energy stored in the spring 51 can be utilized for effecting the actual switching process, i.e. for moving the piston 33 to the right in FIG. 11, so that the switching process can take place in the pressureless state. The cage rotor 29 consequently does not have to take place with a ball 35 actuated into the valve seat 57. This pressureless switching in accordance with the invention therefore requires comparatively small switching forces.

The number of the fluid paths 25 and of the associated valve seats 57 is generally not restricted. A chamber 30 is provided for at least each valve seat 57 in the cage rotor 29, wherein the distribution of valve balls 35 in the chambers 30 is selected in dependence on the switching configurations required for the desired operating states.

It is e.g. possible in this respect to release a plurality of fluid paths 25 simultaneously in order either to apply fluid to two separate drive units 23 simultaneously or to realize, in addition to a rotary drive of the brush roller 13, an operation with e.g. a flat jet or a point jet, a low-pressure operation and/or an operation with chemical cleaning additives via one or more separate nozzles, with such functions also being able to take place—singly or in combination—with a deactivated rotary drive. The functional variety is practically not set any limits due to the "mechanical programmability" of the switching device 19 by the distribution of the balls 35 in the chambers 30.

The arrangement can furthermore be selected such that at least one rotational position of the cage rotor 29 exists in which each fluid path 25 is aligned with a chamber 30 in which a closing element 35 is located. Due to the selection of such a rotational position, it is possible for the user to stop the cleaning member 13 temporarily.

A further possibility not shown in the Figures for realizing a pulse control comprises configuring the holding device 15 by suitable means in a length variable manner such that a user can effect a length variation of the holding device 15 by a pressing or pulling movement, in particular an abrupt pressing or pulling movement, and this length variation is converted into an adjustment movement of an adjustment member.

Such a pulse control is particularly advantageously realizable when, but not only when, the weight of the cleaning member 13 can be utilized, that is in particular when a rope or a hose simultaneously serving as a fluid supply line is used for holding a cleaning member 13 at an inclined surface 11 to be cleaned.

The possibility of a length variation of the holding rope or holding hose can be realized, for example, in that the rope or the hose is provided with a permanent bulge, stabilized by s spring for example, which is bridged by means of a pull element which is coupled to a rotary carrier 45 at the side of the bulge disposed remote from the user, for example corresponding to the embodiment of FIGS. 5 and 6. The rope length or hose length can be shortened due to the bulge, and thus the rotary carrier 45 can be actuated, by an abrupt pulling at the holding rope or at the holding hose.

The weight of the cleaning member 13 subsequently provides the restoration of the starting state, starting from which a repeat switching process can be triggered by the user as required.

REFERENCE NUMERAL LIST 11 surface
13 cleaning member
15 holding device, holding bar, holding member
17 fluid drive
19 switching device
21 switching member, valve
23 drive unit of the fluid drive
25 fluid path, fluid line
27 actuation device
28 pull rope
29 adjustment member, eccentric disk, cage rotor
30 chamber
31 pulse control
33 actuation member
33a actuation section
35 closing element
37 turbine wheel or impeller
37a bucket
39 holder
41 fluid supply line
43 deflection roller
45 rotary carrier
47 panel
49 bristles
51 spring
53 abutment
55 latch ball
57 seat
59 cam section
61 axis of rotation
63 rotary bearing
65 housing
67 axis of rotation
B actuation movement

The invention claimed is:

1. An apparatus for cleaning surfaces, the apparatus comprising:
    at least one cleaning member configured to move during a cleaning operation,
    a holding device for the cleaning member;
    a fluid drive operable in different states for the cleaning member, the fluid drive includes at least one drive unit and at least one fluid path that leads to the or each drive unit;
    a switching device with which a change can be made between the different operating states of the fluid drive; and
    an actuation device having one end connected to the switching device and an opposite end configured to be actuated from a user holding region of the holding device that is remote from the cleaning member, the actuation device is configured to control the switching device such that the switching device can be brought into different switching configurations by either releasing or closing each fluid path upon actuation of the actuation device.

2. The apparatus in accordance with claim 1, wherein first and second different operating states are provided and are distinguished from one another with respect to a direction of movement of the cleaning member.

3. The apparatus in accordance with claim 1, wherein first and second different operating states are provided, the fluid drive being active in at least the first operating state and being interrupted in the second operating state.

4. The apparatus in accordance with claim 1, wherein the switching device is arranged between a fluid supply and the cleaning member in a flow path of a fluid.

5. The apparatus in accordance with claim 1, wherein the switching device has different switching configurations, with there being an association between the different switching configurations of the switching device and the different operating states of the fluid drive.

6. The apparatus in accordance with claim 5, wherein the different switching configurations of the switching device are defined by positions of one or more switching members.

7. The apparatus in accordance with claim 1, wherein the fluid drive comprises the at least one drive unit to which at least first and second fluid paths lead, with the first fluid path being released and the second fluid path being closed in a first operating state and with the first fluid path being closed and the second fluid path being released in a second operating state.

8. The apparatus in accordance with claim 1, wherein the fluid drive comprises at least first and second drive units to which a respective at least one fluid path leads, with the fluid path to a first drive unit being released and the fluid path to a second drive unit being closed in a first operating state and with the fluid path to the first drive unit being closed and the fluid path to the second drive unit being released in a second operating state.

9. The apparatus in accordance with claim 1, wherein the switching device comprises at least one valve which is associated with at least one fluid path and which is adjustable between a release position and a closed position.

10. The apparatus in accordance with claim 1, wherein the actuation device is only mechanically operable.

11. The apparatus in accordance with claim 1, wherein the actuation device is at least partly integrated into the holding device or is formed by the holding device.

12. The apparatus in accordance with claim 1, wherein at least one adjustment movement of an adjustment member can be effected by the actuation device, said adjustment movement being adapted to change a switching configuration.

13. The apparatus in accordance with claim 12, wherein the switching device has a valve arrangement and the valve arrangement of the switching device can be acted on by the adjustment member.

14. The apparatus in accordance with claim 12, wherein an adjustment movement of the adjustment member is a rotational movement.

15. The apparatus in accordance with claim 12, wherein an adjustment movement of the adjustment member can be effected by a rotational movement.

16. The apparatus in accordance with claim 12, wherein an adjustment movement of the adjustment member can be effected by one of a pulling movement, a pushing movement, a pressing movement, a manual pulling movement, a manual pushing movement and a manual pressing movement.

17. The apparatus in accordance with claim 1, wherein an actuation movement of the actuation device can be converted into at least one of a different and a differently oriented adjustment movement of the adjustment member.

18. The apparatus in accordance with claim 1, wherein the actuation device comprises a pulse control for the switching device.

19. The apparatus in accordance with claim 18, wherein the pulse control comprises an actuation mechanism which acts in the manner of one of a ratchet and a catch and with which a to-and-fro movement of an actuation member can be converted into an adjustment movement of an adjustment member.

20. The apparatus in accordance with claim 18, wherein the pulse control has a time variable fluid supply.

21. The apparatus in accordance with claim 20, wherein a device is provided for interrupting and releasing a fluid supply to realize the time variable fluid supply.

22. The apparatus in accordance with claim 18, wherein the pulse control is configured to effect an adjustment movement of an adjustment member at a fluid pressure which is smaller than an operating fluid pressure.

23. The apparatus in accordance with claim 18, wherein the pulse control comprises an actuation member which is held in a first position against a restoring force by a supplied fluid with a released fluid supply and which is movable into a second position by the restoring force by an interruption of the fluid supply, wherein the movement from the first position into the second position can be converted into an adjustment movement of an adjustment member.

24. The apparatus in accordance with claim 1, wherein the switching device has an adjustment member which has a plurality of switching zones which each either release or close the fluid path on an alignment with the fluid path leading to the drive unit of the fluid drive.

25. The apparatus in accordance with claim 24, wherein a movable closing element is provided at one of a switching zones communicating with a fluid supply.

26. The apparatus in accordance with claim 1, wherein the holding device comprises at least one holding bar configured as at least one of a multipart holding bar, a telescopic holding bar.

27. The apparatus in accordance with claim 1, wherein the holding device comprises at least one of a flexible holding member, a bendable holding member and a fluid line.

28. The apparatus in accordance with claim 1, wherein the fluid drive comprises at least one of a turbine wheel and an impeller which can be set into rotation when acted on by a supplied fluid and whose rotation can be converted directly or indirectly, into a movement of the cleaning member.

29. The apparatus in accordance with claim 1, wherein the cleaning member is either jointly driven by at least two drive units for each of a plurality of different operating states or is driven by different drive units in different operating states.

30. The apparatus in accordance with claim 29, wherein the drive units act at different points of the cleaning member.

31. An apparatus for cleaning surfaces, the apparatus comprising:
 a fluid supply line that includes an outlet;
 an elongated holding device that includes an actuation device;
 at least one cleaning member configured to move during a cleaning operation;
 a switching device connected to the actuation device of the elongated holding device; and
 a pair of fluid drives operable in different states for the cleaning member, each of the pair of fluid drives includes a drive unit and a fluid path that extends between the drive unit and the outlet of the fluid supply line,
 wherein the switching device is configured to change between the different operating states of the pair of fluid drives by either releasing or closing each of the fluid paths upon actuation of the actuation device.

32. The apparatus in accordance with claim 31, wherein each of the fluid paths includes a valve moveable between an open position and a closed position, in the open position fluid is permitted to flow from the fluid supply line to the fluid drive, and in the closed position fluid is inhibited to flow from the fluid supply line to the fluid drive,
 wherein upon actuation of the actuation device the switching device switches each of the valves of the fluid paths between the open position and the closed position to change be between the different operating states of the pair of fluid drives.

33. The apparatus in accordance with claim 32, wherein the switching device includes an eccentric disk connected to the actuation device so as to rotate relative to the valves of the fluid paths upon actuation of the actuation device,
wherein upon actuation of the actuation device the eccentric disk rotates to move one of the valves from the open position to the closed position and to move the other of the valves from the closed position to the open position to change between the different operating states of the pair of fluid drives.

* * * * *